United States Patent [19]

Morgan et al.

[11] Patent Number: 5,600,726
[45] Date of Patent: Feb. 4, 1997

[54] METHOD FOR CREATING SPECIFIC PURPOSE RULE-BASED N-BIT VIRTUAL MACHINES

[75] Inventors: Joseph M. Morgan, Amarillo, Tex.; Michael D. Harold, Shreveport, La.

[73] Assignee: Gemini Systems, L.L.C., Shreveport, La.

[21] Appl. No.: 419,001

[22] Filed: Apr. 7, 1995

[51] Int. Cl.$^6$ .................................................. H04L 9/00
[52] U.S. Cl. ................................. 380/49; 380/4; 380/25
[58] Field of Search ........................... 380/4, 23–25, 380/28–30, 49, 18

[56] References Cited

U.S. PATENT DOCUMENTS

| | | |
|---|---|---|
| 4,386,416 | 5/1983 | Giltner et al. . |
| 4,454,575 | 6/1984 | Bushaw et al. . |
| 4,697,243 | 9/1987 | Moore et al. . |
| 4,788,543 | 11/1988 | Rubin . |
| 4,890,240 | 12/1989 | Loeb et al. . |
| 4,893,339 | 1/1990 | Bright et al. ............... 380/28 |
| 4,961,133 | 10/1990 | Talati et al. . |
| 4,961,225 | 10/1990 | Hisano ....................... 380/28 |
| 5,009,833 | 4/1991 | Takeuchi et al. . |
| 5,031,215 | 7/1991 | Pastor ......................... 380/30 |
| 5,038,296 | 8/1991 | Sano . |
| 5,084,813 | 1/1992 | Ono . |
| 5,097,504 | 3/1992 | Camion et al. ............. 380/30 |
| 5,101,491 | 3/1992 | Katzeff . |
| 5,121,496 | 6/1992 | Harper . |
| 5,131,087 | 7/1992 | Warr . |
| 5,150,410 | 9/1992 | Bertrand . |
| 5,153,918 | 10/1992 | Tuai ............................ 380/25 |
| 5,212,768 | 5/1993 | Itsuki et al. . |
| 5,228,116 | 7/1993 | Harris et al. . |
| 5,255,386 | 10/1993 | Prager . |
| 5,276,855 | 1/1994 | Kitahara . |
| 5,278,901 | 1/1994 | Shieh et al. ................ 380/25 |
| 5,285,497 | 2/1994 | Thatcher, Jr. ............... 380/28 |
| 5,305,384 | 4/1994 | Ashby et al. ............... 380/28 |
| 5,315,655 | 5/1994 | Chaplin ...................... 380/25 |
| 5,321,606 | 6/1994 | Kuruma et al. . |
| 5,321,749 | 6/1994 | Virga ........................... 380/18 |
| 5,351,299 | 9/1994 | Matsuzaki et al. ......... 380/29 |
| 5,384,846 | 1/1995 | Berson et al. .............. 380/23 |

*Primary Examiner*—Salvatore Cangialosi
*Attorney, Agent, or Firm*—Jones, Day, Reavis & Pogue

[57] ABSTRACT

A system and method for implementing one or more specific purpose rule-based n-bit virtual processing machines. Specific purposes include, but are not limited to, encryption, compression, and arbitrary precision arithmetic. Each virtual machine consists of a command processor, a rule-base, and an interface between the command processor and the rule-base. Each of the elements of a specific purpose rule-based n-bit virtual machine—the command processor, the rule-base, and the rule-base interface—is preferably implemented as software. In the preferred embodiment, the system uses a stored rule-base as its instruction set and provides for input and output in the form of variable length bit strings of length n where n is any number greater than zero. Each of the rules within the rule-base performs one or more binary string operations against one or more variable length n-bit strings. The function of the rule-base is to provide a set of application specific rules that allows the machine to perform a particular task such as encryption, data compression, or arbitrary precision arithmetic. The system includes a method for providing a software interface to the rule-base. This interface may be a separate program or may be contained within the command processor. The command processor receives input in the form of one or more n-bit data types, performs rule-based operations on the data, and returns output in the form of one or more n-bit data types. Specific system and methods for performing data encryption, data compression, and arbitrary precision arithmetic using the invention are described.

12 Claims, 2 Drawing Sheets

METHOD FOR CREATING SPECIFIC PURPOSE RULE-BASED N-BIT VIRTUAL MACHINES

BACKGROUND OF THE INVENTION

1. Field of the Invention

The present invention relates generally to computer systems and more particularly to a software architecture for implementing specific purpose rule-based n-bit virtual machines to accomplish such tasks as data typing, encryption, compression, arbitrary precision arithmetic, pattern recognition, data conversion, artificial intelligence, device drivers, data storage and retrieval and digital communications.

2. Description of the Related Art

Existing systems designed to process data vary widely in their specific implementations. However, few are designed for the utilization of a rule-base and there are no others known that use, as their primary data type, an arbitrary X number of bits as input, and an arbitrary Y number of bits as output, where X may or may not be equal to Y.

With respect to virtual software machines, of specific mention is U.S. Pat. No. 4,961,133 filed Oct. 2, 1990, wherein Talati et al. disclose a "Virtual Execution Environment on a Target Computer Using a Virtual Software Machine". This invention deals with preprocessing and compiling source program code in such a way as to be operating system independent and to enable the code to execute across heterogeneous computers via a virtual interface system. Though the invention disclosed by Talati et al. involves providing a virtual software machine, it does not address the problem of directly manipulating machine instructions of any given n-bit length via a rule-base to machine instructions of any target n-bit length on a target machine.

With respect to data encryption, most systems apply some form of mathematical operation or bit-wise operation, such as exclusive-or (or XOR) against the input data to be processed based upon an encryption key or password. Normally, the encryption process is highly specialized, encrypting the data in the same theoretical manner from the beginning to the end of the data stream. These methods lend themselves to differential crypto-analysis, a method capable, through analytical means, of deciphering the encrypted message.

Of specific mention is Matasuzaki et al. U.S. Pat. No. 5,351,299 filed Sep. 27, 1994, whose encryption process is very difficult or impractical to break with more standard analytical methods. This method utilizes the standard idea of XORing data together by use of manipulation of a user-provided password. To decrypt, one XORs the encrypted data again, in reverse order, with the same manipulation of the same user-provided password.

Though Matasuzaki et al. break data up into N blocks of M-bit data, the specified Embodiment I states that "each bit outputted from hash function unit is dependent on all the bits inputted thereto." It also states in the embodiments that the primary input blocks are blocks of multiples of 8 bits, and further broken down into blocks of M bits, defined in 8 bits or multiples of 8 bits. This method severely limits introduction of arbitrary block encryption rules and does not allow for a prime number of bits, such as 11 or 13.

The U.S. Pat. No. 5,285,497 to Thatcher, Jr. filed Feb. 8, 1994, specifies encoding variable length Huffman encoded bits in a unique way. However, it does not address the bits as a data type arbitrarily, but in a form having a meaning directed by the Huffman compression means. The invention also requires the use of a specialized microprocessor, a fixed number of specialized encryption rules, and is specific to compressed, digital data streams.

Another unique encryption means as stated in U.S. Pat. 5,097,504 to Camion et al. identifies a signature based encryption means where the signature is recorded with the encrypted message and the encryption keys are stored on another, preferably inviolable, medium. This system applies a highly mathematical and specific encryption means, introducing, again, the problem and limitation of not having a flexible and rather arbitrary rule-base that is easily changeable and modifiable.

In U.S. Pat. No. 5,321,749, Virga presents an extremely unique encryption means that converts the input data into a bitmap and encrypts the bitmap to be targeted for decryption in an optical scanning device. The embodiment specifies XORing randomly generated bits produced from a user-specified password with the encoded bitmap. The bitmap is then converted to specific visual alphabet that can be easily recognized by a receiving scanning device. This method, however, allows an analytical hashing means to decipher the seed(s) generated from the user-specified password with a relatively small amount of time.

With respect to compression, there are many means of compression, all of them having the primary objective of locating the most common occurring data types and encoding them, on average, with a data type of a smaller size.

As an example, suppose the input data is comprised of the characters "ABCAB". A compression means may locate the most commonly occurring character pair, "AB", and encodes them with a single character "Z", thereby reducing the input data to ZCZ.

Though the above is an extremely simple example, the many compression means in existence today vary widely and have many implementations in hardware and software. However varying these compression means may be, a primary limitation exists for all of them. The limitation is that when compression has been achieved by use of the desired compression means, the data can no longer be compressed. This is due to the fact that the compressed output of the data results in a distribution of the input data type such that there is no longer a character or set of characters that occurs more frequently than another character or set of characters. Therefore, further compression is not possible or practical and some compression means will actually explode the size of the input data if the distribution of the characters of the input data type is relatively constant.

With respect to arbitrary precision arithmetic, many algorithms have been written to overcome the limitations of a computer to provide very high levels of precision in mathematical calculations. Though these methods can and do provide any desired precision with mathematical calculations, the calculations are performed algorithmically with the requirement to overcome the internal 8, 16, 32, or 64-bit limitations of the computer's hardware and internal memory mapping. These algorithms require a very high CPU load, demanding much of the computer's internal resources.

With respect to pattern recognition and data conversion, the invention disclosed herein provides enhancement to existing means of the same, introducing arbitrary data typing and a user-defined rule-base, the combination of which is absent in current systems.

In U.S. Pat. No. 5,321,606 filed Jun. 14, 1994, Kuruma et al. describe a user-defined set of transformation rules that define the nature of the grammar of the input data to be converted. The invention solves the problem of writing a specific parser or compiler where the limitations rely upon a specific grammar existent in the input data and a specific output term in the output data. Yet, this invention specifies that the output involves "structures of output terms in association with terminal symbols and nonterminal symbols".

In U.S. Pat. No. 4,890,240 filed Dec. 26, 1989, Loeb et al. describe a rule-based, artificial intelligence system where the rules are specifically defined in two parts, a left-hand side and a right-hand side; whereas, the left-hand side is considered an "if" statement and the right-hand side is considered a "then" statement. This invention is specific to overcoming prior problems in RETE processing and not to arbitrary pattern matching and identification with an externally provided rule-base.

U.S. Pat. Nos. 5,038,296 filed Aug. 6, 1991, 5,084,813 filed Jan. 28, 1992, and 5,101,491 filed Mar. 31, 1992 all refer to rule-based systems for generating program code. Though one of the objectives of the present invention is data transformation of program code from one n-bit machine instruction via an externally provided rule-base to a different n-bit machine instruction, it is not directed at code generation and the invention disclosed herein is not limited as such.

SUMMARY OF THE INVENTION

The present rule-based n-bit virtual machine, or processor, may be implemented in software and/or hardware. When implemented as software, a rule-based n-bit virtual machine converts a general purpose computer into a machine that performs an application specific function.

Further, a virtual processor may execute its instructions either in batch mode or interactively.

It is, therefore, a primary object of this invention to provide a means by which one or more of a data type of n-bit size is selected or received as input, processed by a rule or rules designed for processing one or more of a data type of n-bit size, and outputting or transmitting one or more of the processed data type of an n-bit size. In all data-type cases, the value of N is any number greater than zero. The size, in bits, and number of the input data type do not necessarily have to correspond with the size, in bits, and number of the output data type. Also, any given rule designed to process n-bit data types may or may not be specifically designed to work on an n-bit data type of a particular size in bits.

It is yet another object of the present invention to provide an architecture for creating a specific purpose virtual machine using software that manipulates n-bit data types and rule-based instruction sets.

It is another object to create a command processor controlled by a program and that accepts input in the form of one or more n-bit data types and outputs data in the form of one or more n-bit data types where n is any number greater than zero. The upper value of n is limited only by the physical or virtual address space of the computer.

It is still another object to create an interface program between the command processor and the rule-base called the rule-base interface. Separating the command processor from the rule-base allows the rule-base to be stored in different forms such as, but not limited to, a relational database table, a C or C++ language header file, an object class library, a dynamic link library, an EPROM assembly language subroutine, or a microcode instruction set.

It is a further object of the invention to provide a new method for creating applications relating to various fields within computing including, but not limited to, data typing, data encryption, data compression, arbitrary precision arithmetic, pattern recognition, data conversion, artificial intelligence, data storage and retrieval, and digital communications.

It is yet a further object of the present invention to demonstrate the advantages of the method by describing in detail specific implementations of the invention related to data encryption, data compression, and arbitrary precision arithmetic.

In accordance with one aspect of the invention, a subsidiary object is to provide a new method and system of data encryption. This new method of encryption will employ a command processor and a rule-base and will input and output data as variable length n-bit data types.

In accordance with one aspect of the invention, a further subsidiary object is to provide a new system of data compression. This concept involves, but is not limited to, the implicit redistribution of n-bit data-type frequencies by the explicit compression of data using n-bit data types as input and output. This concept allows the data to be compressed reiteratively.

In accordance with another aspect of the invention, a further subsidiary object is to provide a new system of arbitrary precision arithmetic. This new system of arithmetic will employ a command processor and a rule-base and will input and output data as variable length n-bit words.

BRIEF DESCRIPTION OF THE DRAWINGS

These and other features of the present invention will be more fully disclosed when taken in conjunction with the following DETAILED DESCRIPTION OF THE PREFERRED EMBODIMENTS in which like numerals represent like elements and in which.

DETAILED DESCRIPTION OF THE PREFERRED EMBODIMENTS

Figure 1:
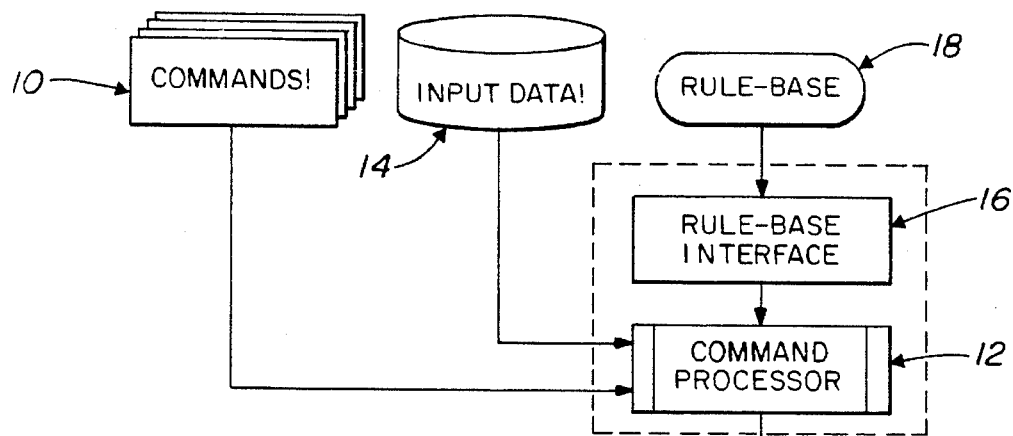
FIG. 1 is a diagram illustrating the organization of a system identifying the principal elements and processes associated with the present invention.

With reference now to the drawings, FIG. 1 shows the organization of the principal elements used in the novel processes of a system and method for implementing a specific purpose rule-based n-bit virtual software driven data processing machine. A program used by the command processor 12 receives, as input, one or more commands identifying the input data source 14 and the instructions and/or arguments 10 which will be used in accessing the rule-base 18. Once a command is received by the command processor 12, data is input to the command processor in the form of one or more n-bit streams from the data source 14. The data is passed to the rule-base interface 16 by the command processor 12. The rule-base interface 16 in turn uses the data to identify and select the rule or rules that are to be used in processing the data. The data is dispatched as one or more arguments to the selected rule within the rule-base 18 and the rule is applied. After the data has been modified in accordance with the specified rule or rules, the modified data is returned to the rule-base interface 16 along with any arguments appended by the last rule applied. These arguments may be used by the rule-base interface 16 to determine the next rule or rules to be applied to the data. These arguments may also consist of key words or messages identifying the current state of the data conversion process. The rule-base interface 16 may iteratively submit the data to one or more rules within the rule-base 18 based on the value or values, if any, of the arguments returned by the previous rule or rules. Once the conditions for the modification of the data by the rule-base have been satisfied, the data is returned as one or more n-bit streams to the command processor 12. The command processor 12 then outputs the data as one or more n-bit streams 20. The size in bits and number of n-bit streams output by the command processor 12 is not required to correspond to the size in bits and number of n-bit streams which were originally input.

Figure 2:
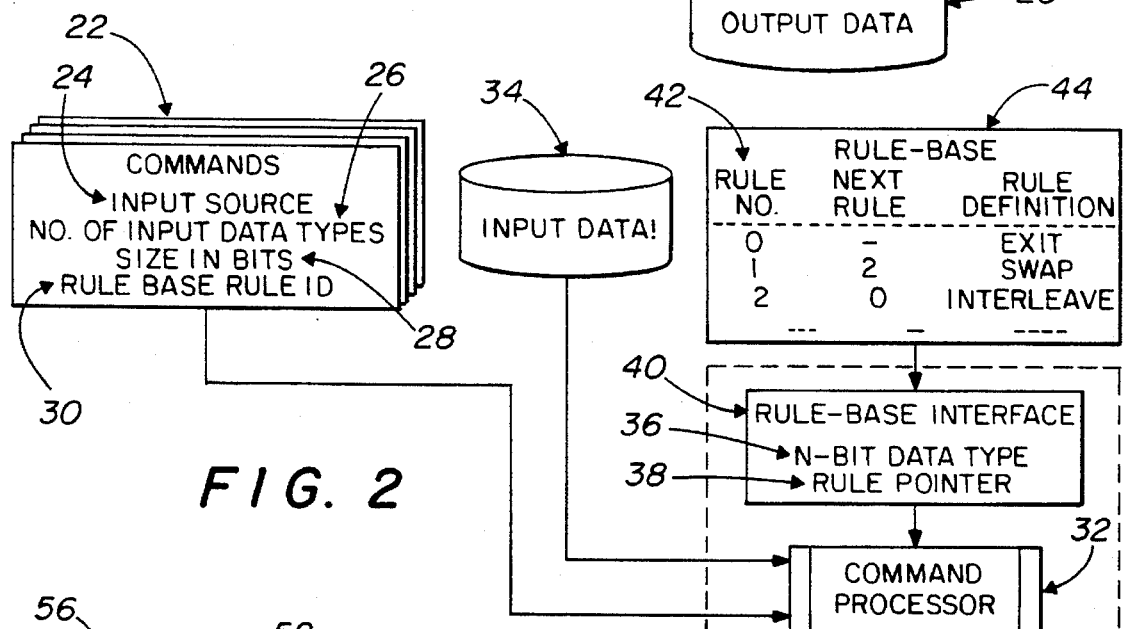
FIG. 2 is a block diagram further illustrating the interrelation of the elements of the invention.

A simple example of the process is shown in FIG. 2. Command line input 22 generates data that identifies the source 24 of the input data, the number of input data types 26, the size of the input data type 28 and the rule-based rule ID 30 that is to be applied to the data. The command line data is processed by the command processor 32 after which the input from data source 34 is read and a rule pointer 38 is generated from the rule ID 30. The n-bit input data 36 and the rule pointer 38 are passed to the rule-base interface 40. The rule-base interface 40 in turn uses the rule pointer 38 to identify the rule 42 to be applied to the data and passes the data to the appropriate identified rule 42 within the rule-base 44. The data is modified by the rule-base 44 and the modified data is returned to the rule-base interface 40. The rule-base interface 40 in turn passes the data to the command processor 32 which outputs the data as one or more n-bit data types 48. The objects of the invention are achieved by the novel application of the rule-base and the use of n-bit data types for input, processing, and output functions. This method, when applied to specific applications, may result in major improvements in the performance and capabilities of existing software application driven processing machines. Furthermore, the use of variable length n-bit data types provides numerous opportunities to create new, specific purpose virtual computing environments which are capable of performing tasks that are not possible using eight bit technologies.

For example, and not by way of limitation, the following description illustrates one method of implementing a virtual machine or computer capable of performing rule-based n-bit encryption:

Rule-based n-Bit Encryption (RNE) encrypts data as a string of binary digits using a command processor, a rule-base interface, and a rule-base. In order to fully realize the benefits of RNE, it is important to realize that all of the data elements of the method, including the data processed by the command processor, the rule-base, and the data itself, are perceived as one or more strings of binary data.

In RNE the bit is the primary data structure. Any or all of the elements of the RNE virtual machine may be input, processed, and output as data. The binary representation of the elements of the RNE virtual machine or processor is a bit stream composed of one or more n-bit data types and is not organized as bytes except where the physical and/or system limitations of the computer require it.

Figure 3:
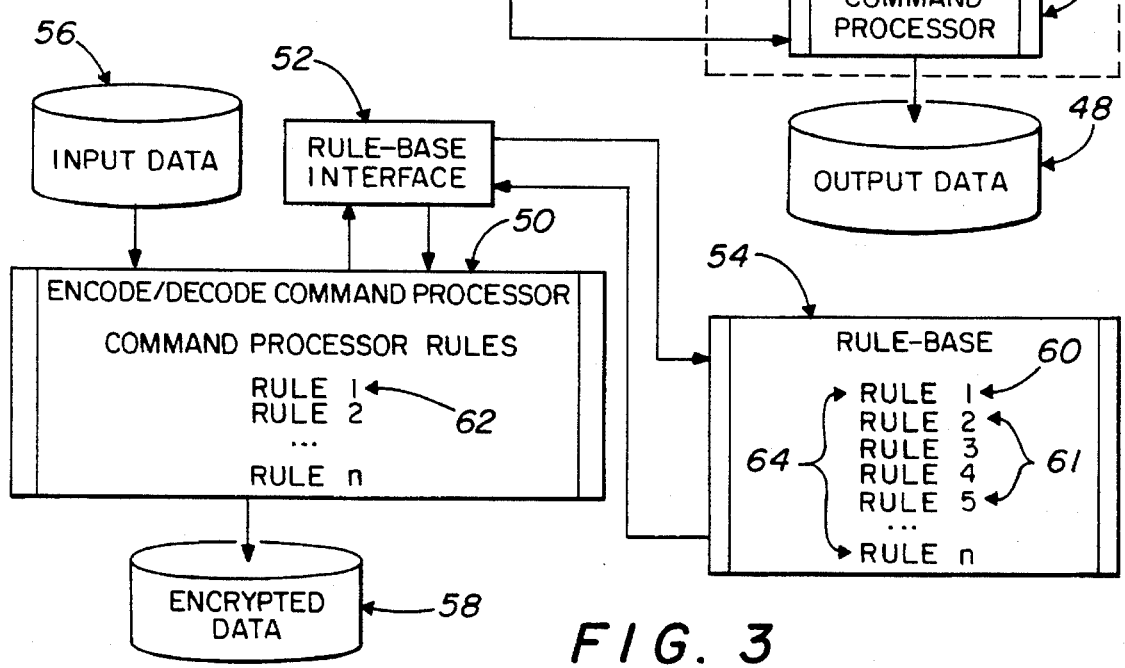
FIG. 3 is a diagram illustrating an implementation of the invention as a data encryption system.

As described in FIG. 3, RNE consists of four principal elements: an encode/decode command processor 50, a rule-base interface program 52, a rule-base 54, the input data or message 56, and the encrypted data or message 58.

The rule-base 54 is composed of one or more rules 60. Each rule 60 may contain variable data and literal data. Each rule 60 may, but is not required to, receive one or more arguments as input. Each rule may, but is not required to, output one or more arguments. The encrypted message is the result of the RNE process. The command processor 50 rules and/or the rules of the rule-base 54 may or may not be contained in the encrypted message 58 at the time transmission occurs.

The command processor 50 is used to access the rule-base 54 and to manage the actual encryption/decryption process. One or more rules 62 may be contained within the command processor 50 to uniquely identify the command processor 50 and/or provide an index or offset into the rule-base 54.

For example, one of the rules 62 contained in the command processor 50 might implement a hashing rule that would use input data 56 to select an encryption key to generate a pointer into the rule-base 54. This would allow any number of public and private encryption keys to implement unique encode/decode rule sets within a single rule-base 54. This would also allow encryption keys to be implicitly user-defined within the command processor 50. Only matched command processors 50 could decode each other's messages. Neither encryption nor decryption is dependent upon an explicit encryption key, a specific encode/decode rule, or a specified data type. However, any encryption key may be defined either implicitly or explicitly.

The command processor 50 may also be used to parse a password or access code in the input data and to pass the resulting values as arguments to one or more rules 60 or rule sets 61 within the rule-base 54.

As an example, an encryption key might be constructed having 3 bytes or 24 bits. Each of the bytes would represent a rule set. Each bit within a byte would represent the application of a specific rule or rule set within a rule set. The bytes 10010101, 11100011 and 00101010 (identified as rule sets 1, 2, and 3, respectively) might be used by the first element of RNE, the command processor 50, to apply the following rules or rule sets:

For rule set number 1, rules or rule sets 1, 4, 6, and 8 would apply.

For rule set number 2, rules or rule sets 1, 2, 3, 7, and 8 would apply.

For rule set number 3, rules or rule sets 3, 5, and 7 would apply.

The total number of combinations for any given implementation using a key having 24 bits is 16,777,216. Because RNE is based on bit string manipulation, there is no upper limit on the length of the encryption key.

The second element of RNE, the rule-base 54, is a set of rules 64 used by the command processor 50 to decode or encode binary strings of data. The rules 64 may be used individually, or as a set to decode or encode data.

The rule-base 54 is not defined as a specific type of data structure. The rule-base 54 may, for example, be stored as a secure table in a relational database, as a C or C++ language header file, as an object class library, as a dynamic link library, or as an EPROM assembly language subroutine, or as a microcode component within a microprocessor.

In addition, access to the rules 64 within a rule-base 54 may be accomplished by the command processor 50 using one or more data structures including, but not limited to, linked lists, tree structures, relational tables, object class libraries, hash tables, or hyper-link stacks.

Following are examples of n-bit binary string operations which may be used to encrypt the input data. Consider, first, examples of vector rules and their explanation.

Examples of Vector Rules

The following rules provide simple examples of the ways bit strings may 15 be manipulated. The number and combination of possible rules is infinite.

---

Inversion
    Invert the following n bits:
        Where n = 7    1011100    becomes    0100011
Transposition
    Transpose the following n pairs of bits:
        Where n = 3    10 11 10    becomes    01 11 01
Interleaving
    Interleave with a ratio 1:1 the following pair of n bits:
        Where n = 4    1011 1001    becomes    1100 1011
Shift lift
    Shift the following n bits x bits to the left:
        Where n = 5, x = 1    11011    becomes    10111
Shift Right
    Shift the following n bits x bits to the right:
        Where n = 5, x = 1    11011    becomes    11101

---

Consider, next, examples of matrix or two-dimensional rules and an explanation of their use.

Examples of Matrix Rules

For each of the following examples, the bit stream 0110 0010 1110 0101 1100 will be the input stream.

Rule 1

Step 1. Enter bits from left to right, top to bottom, into a matrix with 5 rows and 4 columns.

| 0 | 1 | 1 | 0 |
|---|---|---|---|
| 0 | 0 | 1 | 0 |
| 1 | 1 | 1 | 0 |
| 0 | 1 | 0 | 1 |
| 1 | 1 | 0 | 0 |

Step 2. Rotate the matrix 90 degrees to the left resulting in a matrix with 4 rows and 5 columns.

| 0 | 0 | 0 | 1 | 0 |
|---|---|---|---|---|
| 1 | 1 | 1 | 0 | 0 |
| 1 | 0 | 1 | 1 | 1 |
| 0 | 0 | 1 | 0 | 1 |

Step 3. Write the bits from left to right, top to bottom

---

Result:    0001 0111 0010 1110 0101
Original:    0110 0010 1110 0101 1100

---

Note: This is equivalent to a reverse interleave of X, n-bit data types, where X=5, n=4. The larger the values of X and n, the larger the adjacency displacement.

Rule 2

Step 1. Enter the bits from left to right, top to bottom, into a matrix with 4 rows and 5 columns.

| 0 | 1 | 1 | 0 | 0 |
|---|---|---|---|---|
| 0 | 1 | 0 | 1 | 1 |
| 1 | 0 | 0 | 1 | 0 |
| 1 | 1 | 1 | 0 | 0 |

Step 2. Rotate the matrix 180 degrees.

| 0 | 0 | 1 | 1 | 1 |
|---|---|---|---|---|
| 0 | 1 | 0 | 0 | 1 |
| 1 | 1 | 0 | 1 | 0 |
| 0 | 0 | 1 | 1 | 0 |

Step 3. Invert the bits.

| 1 | 1 | 0 | 0 | 0 |
|---|---|---|---|---|
| 1 | 0 | 1 | 1 | 0 |
| 0 | 0 | 1 | 0 | 1 |
| 1 | 1 | 0 | 0 | 1 |

Step 4. Write the bytes from left to right, top to bottom.

---

Result:    1100 0101 1000 1011 1001
Original:    0110 0010 1110 0101 1100

---

Rule 3

It is possible to use multiple arrays to encrypt bit streams and to combine vector rules with array operations. The following rule uses three matrices. The first matrix (a) is 3 rows by 4 columns. The second matrix (b) is 2 rows by 3 columns. The third matrix (c) is 1 row by 2 columns.

Step 1. Read the first 12 bits of the input stream into 3 4-bit data types.
0110 0010 1110

Step 2. Treating each data type individually, shift each bit 1 bit to the left.
1100 0100 1101

Step 3. Fill matrix (a) entering each data type into each of the three rows.

| 1 | 1 | 0 | 0 | (a) |
|---|---|---|---|---|
| 0 | 1 | 0 | 0 | |
| 1 | 1 | 0 | 1 | |

Step 4. Enter the remaining bits from left to right, top to bottom, into matrices (b) and (c).

| 0 | 1 | 0 | (b) |
|---|---|---|---|
| 1 | 1 | 1 | |

| 0 | 0 | (c) |
|---|---|---|

Step 5. Swap matrices (b) and (c).

(c)
| 0 | 0 |
|---|---|

(b)
| 0 | 1 | 0 |
|---|---|---|
| 1 | 1 | 1 |

Step 6. Rotate all three matrices 90 degrees to the left.

(a)
| 0 | 0 | 1 |
|---|---|---|
| 0 | 0 | 0 |
| 1 | 1 | 1 |
| 1 | 0 | 1 |

(c)
| 0 |
|---|
| 0 |

(b)
| 0 | 1 |
|---|---|
| 1 | 1 |
| 0 | 1 |

Step 7. Write the bits from left to right, top to bottom.

| Result:   | 0010 0001 1110 1110 1001 |
|-----------|--------------------------|
| Original: | 0110 0010 1110 0101 1100 |

Additional rules may be created for any n-dimensional data representation. There is no upper limit on the number of possible rules or the manner or order in which they are implemented.

The use of public and/or private specific purpose keys such as encryption keys is optional. The encryption and decryption of data is not dependent on an explicit encryption key, a specific encode/decode rule or a specific data type. An uncountable number of encryption keys may be applied against a single implementation of RNE each one of which enforces a unique rule-set, each set containing unique encode/decode rules, in a unique order. Each encryption key may be explicitly or implicitly defined. Thus by providing multiple encryption keys to a single encrypted message, parts of the message will be available only to some users and not others when the message is distributed across multiple machines for multiple users.

The successful encryption or decryption of the data is not dependent on the size of the encryption key or the speed of capacity of the processor. Without access to the encryption key, the command processor rules, and the rule-base, it is impossible to establish a correspondence between the original data and the encrypted data.

For example, and not by way of limitation, the following representative program listing in C details a second example implementation of Rule-based n-Bit Encryption (RNE).

21 rule-base, it is impossible to establish a correspondence between the original data and the encrypted data.

For example, and not by way of limitation, the following representative program listing in C details a second example implementation of Rule-based n-Bit Encryption (RNE).

```
/*
BME.C        Binary Matrix Encryption
             An Example Implementation of Rule-Based n-Bit Encryption.

Program Development Log:

Release of Version 1.10
                                                                    */ include <stdio.h>
include <io.h>
#include <malloc.h>
#include <conio.h>
#include <math.h>
#include <graph.h>
#include <string.h>
#include <mstring.h>
#include <stdlib.h>
include <mstdlib.h> define YES      1
define NO       0 define IN       'I'
define OUT      'O'
#define OFF      0
define ON       1 define FULL     0
define NOTFULL  1
```

22

```
/*_____
   Matrix Definition
   _____*/ typedef struct matrixTAG { unsigned int x, y;
                              unsigned long size;
                              char *matrix; } MATRIX;

/*_____
   Function Definitions
   _____*/ char AddByteToMatrix(unsigned char);
void AllocateBuffers(void);
void AllocateLargestMatrix(void);
void CleanUp(char *);
void ClearMatrix(void);
void ClearBitCan(void)
void DefineMatrix(void);
void DisplayProgress(void);
void DisplayTitle(void);
int FillMatrix(void);
void FlushOutBuffer(void);
unsigned char GetBitStrVal(char *);
int GetNextByte(void);
void GetOptimalScale(void);
void InvertMatrix(void);
void NoArguments(void);
void OpenInFile(char *);
void OpenOutFile(void);
void PutNextByte(int);
void SendBitAtXY(long, long, unsigned int);
void SetEncryptionMethod(char *);
void SetInversionFreq(char *);
void SetMode(char);
void SetNextMethod(void);
void SetPassWord(char *)
void SwapScale(void);
int TimeToInvert(void);
void WriteBit(char);
```

23

```
void WriteReverse(void);

/*_____

Matrix Encryption Functions

The following matrix encryption functions are the most simplistic variations on
arbitrarily approaching the matrix. Even so, these functions confuse the data
so much that no one could, with any degree of certainty decipher even one of
the rules contained here.

There are ways to make and process three-dimensional matrices, and virtually
any 2D or 3D shape would work. There are no means possible to figure out
the total number of rules that can be applied to this method, since, of course,
another bit could always be added, the shape or size changed, or some other
variations utilized like adding an arbitrary bit every X number of bits. Thus,
one would not know from where all the bits came, or to where they should go.

The number of rules is really the limit of the imagination's ability to create
them.
_____*/ define NUM_RULES 7              /*There are actually 8 rules*/
                                 /*butTopRightDown          */
                                 /*doesn't do anything.     */
void BottomLeftUp(void);
void BottomRightUp(void);
void BottomUpLeft(void);
void BottomUpRight(void);
void TopDownLeft(void);
void TopDownRight(void);
void TopLeftDown(void);

/*_____

File Pointers and File Names
_____*/

FILE *InFile, *OutFile;
char OutFileName[L_tmpnam];
```

24

```
/*_____
   Global Variables
   _____*/ define MAX_BUFFER 16384 unsigned char *InBuffer, *OutBuffer;
int OutByteCount = 0;

MATRIX Matrix;
unsigned long MatrixCount = 0L;

char *PassWord;
unsigned PassWordLen = 0 char BitCan[9];
unsigned char LeftOver[9];
```

```
/*_____
```

The following data type is an array of pointers to the various encryption rules. It acts as the rule-base interface. Since the rules are set up as an array of function pointers, not only can rules be added or subtracted with great ease, they can be reordered. In other words, this particular example program can be compiled as shown to produce an encryption engine. Then the rule order can be changed in the pointer array defined below. Then the program can be recompiled to create another encryption engine. The two resulting encryption engines would be theoretically identical, but the first would not be able to decode a data stream encoded by the second, and vice-versa. With enough rules, therefore, as many unique encryption engines could be created as desired. Each one of those unique encryption engines would have hundreds of billions of password-method implementations Also, because the rules are set in an internal data-array, it would be easy to add rule-order rules, so that an operation like the checksum of the incoming data would trigger a rule that reorders the rule pointers on the fly. In other words, not only does the end-user have some control over the encryption, but the data itself would be a player in the total scheme of things. Thus, one who is uninformed would have to know beforehand the unencrypted version of the data before attempting to decrypt it.
═══════════════════════════════════*/

```
void (*Rule[NUM_RULES])(void) = {BottomUpLeft, BottomUpRight,
                                 BottomLeftUp, BottomRightUp,
                                 TopLeftDown,  TopDownLeft,
                                 TopDownRight };

int *EncryptionMethod;
unsigned RuleID = 0;
char Mode = IN unsigned long FileSize = 0L;
unsigned long TotalBytesRead = 0L;
```

/*═══════════════════

User Definable Switches
═══════════════════*/

```
unsigned char Inversion = OFF;
unsigned long InversionFreq = 0L;
```

/*═══════════════════════════════════

Program Code Follows

BME mode filename password1 password2 {/i=x}

- mode is either I or O.
- filename is the file to encrypt.
- password1 defines the sizes of the matrices. This way, the matrices vary in size as the file is encrypted. Therefore if a hacker were to experience some miracle of guessing the correct matrix size, the correct method, and whether it had been inverted, the rest of the file would still be junk to him. Pass it twice, and he would never know that he got it right in the first place!
- password2 defines the way that the rules are used. Each letter of password 2 represents, rather arbitrarily (see later) a rule to use for encryption/decryption. That way, the rules to use for each matrix are randomly selected by the use of password2. This is very helpful. Because the command processor can rotate through password1 and password2, a given matrix size is most likely going to be encrypted different ways each time it is used.

- For this implementation and just to complicate matters, the /i=x switch was added to provide the requirement that for each frequency of X matrices, invert the Xth matrix. This way, the uninformed would not even know the original value of any given bit in the file! So a '1' is present. Was it originally '1' or '0'? There is no way to know without knowing who encrypted the file.

```
                                                                    */ void main(int argc, char *argv[])
{
        char lastbit = 0;

DisplayTitle();

if (argc <5)
                NoArguments();

AllocateBuffers();

SetMode(argv[1][0]);

OpenInFile(argv[2]);
        OpenOutFile();

SetPassWord(argv[3]);

DefineMatrix();

SetEncryptionMethod(argv[4]);

switch (argc) {
                case 6:
                        SetInversionFreq(argv[5]);
        } while (FillMatrix() !=EOF) {
```

27

```
                ++MatrixCount;

DisplayProgress();

                if(TimeToInvert() == YES)
                        InvertMatrix();

(*Rule[RuleID])();

                DefineMatrix();

SetNextMethod();

}
        if(strlen(Matrix.matrix)) {
                if(strlen(Matrix.matrix) != Matrix.size) {

Matrix.size = strlen(Matrix.matrix);
                        GetOptimalScale();
                        if (Matrix.size == 0) { lastbit = *(Matrix.matrix + Matrix.size - 1);
                                --Matrix.size;
                                *(Matrix.matrix + Matrix.size) = '\0';

GetOptimalScale();
                        }
                }

(*Rule[RuleID])();

if(lastbit)
                        WriteBit(lastbit);
        }

CleanUp(argv[2]);
        exit(0);
   }
```

```
/*_____

These functions are involved in setup and shutdown.
                                                  */
_____

/*_____

SetMode - This is where from the command line, either a 'I' or a 'O' is used.
It really doesn't matter which is used as long as the opposite letter is used to
decrypt as was done to encrypt. In other words, if I is used to encrypt, O is
used for the decrypt, and vice-versa.
                                                  */
_____ void SetMode(char mode)
{
        Mode = toupper((int)mode);

if(Mode !=IN && Mode !=OUT) {
                printf("\nInvalid Mode: [%c]. Use IN or OUT\n",Mode);
                exit(1);
        }
}

/*_____

Buffer the input and output.
                                                  */
_____ void AllocateBuffers(void)
{
        InBuffer  =  (unsigned   char   *)malloc(MAX_BUFFER  *
        sizeof(unsigned char));
        OutBuffer -  (unsigned   char   *)malloc(MAX_BUFFER  *
        sizeof(unsigned char));

if (InBuffer == NULL || OutBuffer == NULL) {
                puts("\nNot Enough Memory\n");
                exit(1);
        }
```

```
}

/*━━━━━━━━━━━━━━━━━━━━━━━━━━━━━━━━━━━━━━━━━━━━━
  Open the file to encrypt or decrypt.
  ━━━━━━━━━━━━━━━━━━━━━━━━━━━━━━━━━━━━━━━━━━━━*/ void OpenInFile(char *fname)
{
        if((InFile = fopen(fname, "rb")) == (FILE *)NULL {
                printf("\nCan't Open %s for Input\n", fname);
                exit(1);
        }

FileSize = filelength(fileno(InFile));
}

/*━━━━━━━━━━━━━━━━━━━━━━━━━━━━━━━━━━━━━━━━━━━━━

Open a file in which to write the encrypted/decrypted data. A temporary
  name is used here for example only.
  ━━━━━━━━━━━━━━━━━━━━━━━━━━━━━━━━━━━━━━━━━━━━*/ void OpenOutFile(void)
{
    tmpnam(OutFileName);

if((OutFile = fopen(OutFileName, "wb")) == (FILE *)NULL) {
            printf("\nCan't Open %s for Output\n", OutFileName);
            exit(1);
    }
}

/*━━━━━━━━━━━━━━━━━━━━━━━━━━━━━━━━━━━━━━━━━━━━━
```

This is the user's first password argument derived from the fourth command line argument. If there is not an even number of characters, one character is added so that an even number of characters is used for the matrices. It does not have to be done this way. It could be done any number of ways in this particular application. Here, the first password is used to define the matrix sizes. It is made to be an even number of characters so there is a Y for every X. If a new character is not added to bring the first password length to an even number of characters, that new character is simply assigned the same value as the first character of the password. That, too, is arbitrary and can actually be done any number of ways.

Here, the ASCII decimal value of the character is used as the matrix axis value. For example, suppose the password is 'ABCD'. The ASCII decimal values for A, B, C, and D are 65, 66, 67, and 68, respectively. The first matrix axes are defined using A and B. The size of the matrix, therefore, is 65 bits by 66 bits = 4290 bits. The next matrix axes are defined using C and D, thus it's size is 67 by 68 bits. Since, in this example, there are no more characters, simply begin again at the beginning of the password with A and B. Since the password is case-sensitive, all 256 ASCII characters are usable.
*/

```
void SetPassWord(char *passwordarg)
{
        unsigned int len, size;

size = len = strlen(passwordarg);

if(len % 2)
                ++size;

PassWord = (char *)malloc((size + 2) * sizeof(char));

if(PassWord == NULL) {
                puts("\nOut of Memory\n");
                exit(1);
        } strcpy(PassWord, passwordarg);

if(len !=size) {
                *(PassWord + len) = *passwordarg;
                *(PassWord + size) = '\0';
        }

PassWordLen = size;
```

```
        }

/*_____

        Here, the second password provided by the user is used as a tool to decide
        which rule to use.

The ASCII character set is implicitly divided into blocks, each the size in
        characters as the number of rules available. Then the relative position of each
        password2 character within its block is found.  That position is one of the
        numbers 0 to NUM_RULES - 1. This points, then, to a rule in the rule-base.

This is a good way to do it since, at any time, the number or order of rules in
        the rule-base can be changed. If the order or number of rules is changed, then
        this code does not have to be changed.
_____*/ void SetEncryptionMethod(char *method)
        {
                unsigned int len, val, x;
                int *eptr;

len = strlen(method) + 1;

                EncryptionMethod = (int *)malloc(len * sizeof(int));

for(eptr = EncryptionMethod; *method !='\0'; method++,
                eptr++) {

                        val = (*method / NUM_RULES) * NUM_RULES;

for (x = 0; x <NUM_RULES; x++)
                            if ((val + x) == *method)
                                *eptr = x;
                }
                *eptr = -1;

RuleID = *EncryptionMethod;
        }
40
```

32

/*_____

This code takes the optional command line switch and parses it for inversion frequency. The program then inverts each Xth matrix before encrypting it.

Consider an example. Suppose the user enters the following command line:

BME I filename ABC 12345 /i=3

The first password 'ABC' is lengthened to 'ABCA' so that it will contain an even number of characters. The letters are then converted to the ASCII decimal equivalents (65, 66, 67, 65) and used, alternately, as X and Y matrix axis values. The second password '12345', by application, translates to rule pointers 0, 1, 2, 3, and 4, respectively. The '/i=3' sets the inversion frequency to 3, telling the program to invert every third matrix prior to its alteration by its assigned rule.

The following table describes each matrix size, which rule is use, and whether or not the matrix is inverted.

| Matrix Size in Bits | | | Rule Used | Inverted? | # Bytes |
|---|---|---|---|---|---|
| X | Y | Size | 0 to Total | Y or N | Accum. |
| 65 | 66 | 4290 | 0 | N | 536 1/4 |
| 67 | 65 | 4355 | 1 | N | 1080 5/8 |
| 65 | 66 | 4290 | 2 | Y | 1616 7/8 |
| 67 | 65 | 4355 | 3 | N | 2161 1/4 |
| 65 | 66 | 4290 | 4 | N | 2697 1/2 |
| 67 | 65 | 4355 | 0 | Y | 3241 7/8 |
| 65 | 66 | 4290 | 1 | N | 3778 1/8 |
| 67 | 65 | 4355 | 2 | N | 4322 1/2 |
| 65 | 66 | 4290 | 3 | Y | 4858 3/4 |
| 67 | 65 | 4355 | 4 | N | 5403 1/8 |

...and so on to 30 different entries before it begins to repeat.

If the command line is symbolized as:

BME mode filename P1 P2 /i=F, the way to calculate the number of table entries is:

```
                # Chars in P1 (rounded up to the nearest even number)
Divided by      2
Multiplied by   # Chars in P2
Multiplied by   F(if defined)
```

Therefore, this example is:

P1 = 'ABC', P2 = '12345', F=3

The number of characters in P1 = 3, rounded up to the nearest even number equals 4. The number of characters in P2 = 5. Therefore, the number of table entries for this example is:

(4/2) * 5 * 3 = 2 * 5 * 3 = 30
*/

```
void SetInversionFreq(char *freq)
{
    freq +=3;

InversionFreq = atol(freq);
    if (InversionFreq < 1L)
            InversionFreq = 0L;
    else
            Inversion = ON;
}
```

/*

This function writes out all remaining data, closes files, deletes the original file, renames the encrypted temporary file to the name of the original file, and then cleans up all allocated memory.
*/

34

```
void CleanUp(char *fname)
{
    FlushOutBuffer();

fclose(InFile);
    fclose(OutFile);

unlink(fname);
    rename(OutFileName, fname);

DisplayProgress();

free(Matrix.matrix);
    free(InBuffer);
    free(OutBuffer);
    free(PassWord);
    free(EncryptionMethod);
```

/*———————————————————————————————

Provide instructions if procedures not correctly followed.
———————————————————————————————*/

```
void NoArguments(void)
{
    puts("\nBME mode infile password method {/i=n}\n");
    puts ("Modes are: IN | OUT");
    exit(1);
}
```

/*———————————————

Other Functions
———————————*/

```
void Display Title(void)
{
    puts("\nBME - Binary Matrix Encryption");
    puts("Version 1.0 - Release 09.94");
```

35

```
        puts("(c) 1994: Michael D. Harold & Joseph M. Morgan\n");
    } void Display Progress(void)
    {
        printf("\rProcessing:    (%6.2f%c)",   ((float)TotalBytesRead   /
        (float)FileSize * 100., 37);
    }

/*▬▬▬▬▬▬▬▬▬▬▬▬▬▬▬▬▬▬▬▬▬▬▬▬▬▬▬▬▬▬▬▬▬▬▬▬▬▬▬▬▬▬▬▬▬▬▬

The following functions handle the matrix.
    ▬▬▬▬▬▬▬▬▬▬▬▬▬▬▬▬▬▬▬▬▬▬▬▬▬▬▬▬▬▬▬▬▬▬▬▬▬▬▬▬▬▬▬▬▬▬▬*/

/*▬▬▬▬▬▬▬▬▬▬▬▬▬▬▬▬▬▬▬▬▬▬▬▬▬▬▬▬▬▬▬▬▬▬▬▬▬▬▬▬▬▬▬▬▬▬▬

This function manages the rotation through password1 using adjacent
    characters to set the matrix size. Note that this implementation forces a matrix
    axis to be at least 2.
    ▬▬▬▬▬▬▬▬▬▬▬▬▬▬▬▬▬▬▬▬▬▬▬▬▬▬▬▬▬▬▬▬▬▬▬▬▬▬▬▬▬▬▬▬▬▬▬*/ void DefineMatrix(void)
    {
        static unsigned int PassWordPtr = 0;
        static char MatrixDefined = NO;

if (MatrixDefined == NO)
            AllocateLargestMatrix();

Matrix.x = (long)*(PassWord + PassWordPtr++);
        Matrix.y = (long)*(PassWord + PassWordPtr++);

if (PassWordPtr == PassWordLen)
            PassWordPtr = 0;

if (Matrix.x <2)
            Matrix.x = 2;

if (Matrix.y <2)
```

36

```
                Matrix.y = 2;

Maxtrix.size = Matrix.x * Matrix.y;

           MatrixDefined = YES;
      }

/*_____
      Instead of allocating and freeing memory as the matrices shift their size, the
      largest matrix is allocated and that space used.
      _____*/

      void AllocateLargestMatrix(void)
      {
           unsigned size, MaxSize = 0, x, y;
           char *ptr = PassWord;

           while (*ptr != '\0') {
                     x = *ptr++;
                     y = *ptr++;

size = x * y;
                     if (size > MaxSize)
                            MaxSize = size;
           }

Matrix.matrix = (char *)malloc((MaxSize +1) * sizeof(char));
           if (Matrix.matrix == (char *)NULL) {
                     puts("\nOut of Memory\n");
                     exit(1);
           }
      }

/*_____
      This function manages the conversion from byte-based reading to bit-based
      reading. Note that a matrix is simply an n-Bit word. So, an n-Bit word of
```

37 matrix size is filled with bits from the input. To optimize the process (and it
could be better), bits are added to the matrix 8-at-a-time.
*/

```
      int FillMatrix (void)
      {
          int c;

ClearMatrix();
          if (strlen(LeftOver)) {
                  strcpy(Matrix.matrix, LeftOver);
                  LeftOver [0] = '\0';
          }
          if (strlen(Matrix.matrix) = = Matrix.size)
                  return 1;

while ((c = GetNextByte()) !=EOF) {
              TotalBytesRead+ +;

if (AddByteToMatrix((unsigned char)c) = = FULL) break;
          }
          if (c = = EOF && !(feof(InFile))) {
              puts("\nUnexpected EOF");
              exit(1);
          }
30
          return c;
      }
```

/*─────────────────────────────────────────────────

To keep things neat, even though unnecessary, the following program sets the
matrix to NULL.
*/
```
void ClearMatrix(void)
{
```

```
                unsigned long x;

for (x = 0; x <= Matrix.size; x++)
                        *(Matrix.matrix + x) = '\0';
        }

/*_____

This function adds bits to the matrix, up to 8-at-a-time. If it is unable to add
        all 8 bits to the matrix, it copies the remaining bits to a holding bin called
        LeftOver. Note its use above in FillMatrix.
                                                        */ char AddByteToMatrix(unsigned char byte)
        {
                char bytestr[9];
                int nbits;

chartobinstr(byte, bytestr);

nbits = (Matrix.size - strlen(Matrix.matrix));
                nbits = (nbits > 8) ? 8 : nbits;

strncat(Matrix.matrix, bytestr, nbits);

if (nbits < 8)
                        strcpy(LeftOver, (bytestr + nbits));

return (strlen(Matrix.matrix) == Matrix.size) ? FULL :
                        NOTFULL;
        }

/*_____

This next three functions control the physical input and output of data via two
        16K buffers.
                                                        */ int GetNextByte(void)
        }
```

39

```
        static int BytePtr = 0;
        static int BytesInBuffer = 0;

if (BytePtr == BytesInBuffer) {
                BytesInBuffer = fread(InBuffer, sizeof(unsigned char),
                MAX_BUFFER - 1, InFile);

if (BytesInBuffer == 0)
                        return EOF;

BytePtr = 0;
        } return *(InBuffer + BytePtr++);
} void PutNextByte(int c)
{
        *(OutBuffer + OutByteCount) = c;

if (++OutByteCount == MAX_BUFFER - 1) {
                fwrite(OutBuffer,sizeof(unsigned char), MAX_BUFFER - 1,
                OutFile);
                OutByteCount = 0;
        }
} void FlushOutBuffer(void)
{
        fwrite(OutBuffer, sizeof(unsigned char), OutByteCount, OutFile);
}

/*_____

This function handles the output of single bits. It accumulates bits, for
example only, into an 8-bit buffer to translate back into bytes to accommodate
the architecture. Once 8 bits are accumulated, it is converted into a real byte
and sent to the output buffer.
_____*/ void WriteBit(char bit)
```

```
    {
        static int BitCanPtr = 0;
        BitCan[BitCanPtr++] = bit;

if (BitCanPtr == 8) {
                PutNextByte(GetBitStrVal(BitCan));
                BitCanPtr = 0;
                ClearBitCan();
        }
    } void ClearBitCan(void)
    {
        int x;

for (x = 0; x < 8; x++)
                BitCan[x] = '\0';
    }
```

/*_____

The following function receives a bit stream and converts it into an actual
unsigned character value.
_____*/

```
    unsigned char GetBitStrVal(char *bitstr)
    {
        unsigned char value, x;

for (x = 128, value =0; *bitstr !='\0'; bitstr++, x /=2)
                if (*bitstr == '1')
                        value += x;

return value;
    }
```

41

```
/*_____
   The following function determines when it is time to invert the matrix.
   Returns YES or NO.
                                                                    */ int TimeToInvert(void)
   {
          if (Inversion  ==  OFF  ||  MatrixCount  <  InversionFreq  ||
          !InversionFreq)
                 return NO;

if (!(MatrixCount % InversionFreq))
                 return YES;

return NO;

}

/*_____

Following are various rules by which to encrypt the matrix.  Envision the X
   axis as vertical and the Y axis as horizontal.
                                                                    */

/*_____

The following rule writes bits beginning from the bottom right corner of the
   matrix, moving left through that row, then moving up one row to the end and
   continuing in that manner until the matrix is completely written out.
                                                                    */ void BottomLeftUp(void)
   {
          register long x, y;
          unsigned int len;

len = strlen(Matrix.matrix);

for (x = Matrix.x - 1; x>=0; x--)
```

42

```
                for (y = Matrix.y - 1; y>=0; y--)
                        SendBitAtXY(x, y, len);
}
```

/*─────────────────────────────────────────

The following rule starts at the bottom left corner, moves right through the row, moves up one row to the beginning and continues until the matrix is written out.
─────────────────────────────────────*/

```
void BottomRightUp(void)
{
        register long x, y;
        unsigned int len;

len = strlen(Matrix.matrix);

for (x = Matrix.x - 1; x>=0; x--)
                for (y = 0; y < Matrix.y; y++)
                        SendBitAtXY(x, y, len);
}
```

/*─────────────────────────────────────────

The next rule starts at the bottom right corner, moves up through the column, then moves left one column at the bottom, and continues.
─────────────────────────────────────*/

```
void BottomUpLeft(void)
{
        register long x, y;
        unsigned int len;

if (Mode == OUT)
                SwapScale();

len = strlen(Matrix.matrix);

for (y = Matrix.y - 1; y >=0L; y--)
```

43

```
            for (x = Matrix.x - 1; x > =0L; x--)
                    SendBitAtXY(x, y, len);
    }

/*_____

This rule starts at the bottom left corner, moves up through the column, moves
    right to the bottom of the next column, and continues.
    _____*/ void BottomUpRight(void)
    {
            register long x, y;
            unsigned int len;

if (Mode == OUT) {
                    strrev(Matrix.matrix);
                    SwapScale();
            } len = strlen(Matrix.matrix);

for (y = 0L; y < Matrix.y; y++)
                    for (x = Matrix.x - 1; x > =0; x--)
                            SendBitAtXY(x, y, len);
    }

/*_____

This rule starts at the top right corner, moves down through the column,
    moves left to the bottom of the next column, and continues.
    _____*/ void TopDownLeft(void)
    {
            register long x, y;
            unsigned int len;

if (Mode == OUT) {
```

```
                strrev(Matrix.matrix);
                SwapScale();
        } len = strlen(Matrix.matrix);

for (y = Matrix.y - 1; y >=0; y--)
                for (x = 0L; x < Matrix.x; x++)
                        SendBitAtXY(x, y, len);
}
```

```
/*_____

The next rule starts at the top left corner, moves down through the column,
then right to the top of the next column, and continues in like manner.
_____*/ void TopDownRight(void)
{
        register long x, y;
        unsigned int len;

if (Mode == OUT) {
                SwapScale();
        } len = strlen(Matrix.matrix);

for (y = 0L; y < Matrix.y; y++)
                for (x = 0L; x < Matrix.x; x++)
                        SendBitAtXY(x, y, len);
}
```

```
/*_____

The next rule starts at the top right corner, moves left through the row, down
and to the end of the next row, and continues in like manner.
_____*/
```

```
void TopLeftDown(void)
{
        register long x, y;
        unsigned int len;

len = strlen(Matrix.matrix);

for (x = 0; x < Matrix.x; x++)
                for (y = Matrix.y-1; y >=0; y--)
                        SendBitAtXY(x, y, len);
}
```

/*─────────────────────────────────────────────
This rule starts at the top left corner, moves right through the row, down and to the beginning of the next row, and so on. Since this is exactly the way the matrix is constructed, it doesn't actually perform any encryption. It is put here to complete the rule set, but this implementation does not use it.
─────────────────────────────────────────────*/

```
void TopRightDown(void)
{
        register long x, y;
        unsigned int len;

len = strlen(Matrix.matrix);

for (x = 0; x < Matrix.x; x++)
                for (y = 0; y < Matrix.y; y++)
                        SendBitAtXY(x, y, len);
}
```

/*─────────────────────────────────────────────
These are functions common to the matrix conversion rules.
─────────────────────────────────────────────*/

46

```
/*═══════════════════════════════════════════════

This function is required to decrypt certain rules. The matrix axes have to be
swapped to properly recover the data.
 ═══════════════════════════════════════════════*/ void SwapScale(void)
{
         unsigned long n;

n = Matrix.x;
         Matrix.x = Matrix.y;
         Matrix.y = n;
}

/*═══════════════════════════════════════════════

This function inverts the matrix, turning every '1' bit to a '0', and every '0'
bit to a '1'.
 ═══════════════════════════════════════════════*/ void InvertMatrix(void)
{
    char *ptr;

for (ptr = Matrix.matrix; *ptr !='\0'; ptr++)
         *ptr = (*ptr=='1')?'0':'1';
}

/*═══════════════════════════════════════════════

This function manages the rotation through the rule pointers defined by
password2.
 ═══════════════════════════════════════════════*/ void SetNextMethod(void)
{
    static int MethodPtr = 1;
```

47

```
         RuleID = *(EncryptionMethod + Method Ptr++)

if (*(EncryptionMethod + MethodPtr) = = -1)
              MethodPtr = 0;
     }

/*_____

     This function locates the bit in the matrix at x, y and writes it to the output
     stream.
                                                                          */

     void SendBitAtXY(long x, long y, unsigned int len)
     {
         unsigned long offset;

offset = (x * Matrix.y) + y;
         if (offset < (long)len)
              WriteBit(*(Matrix.matrix + offset));
     }

     /*_____

This function defines the scale by the number of bits in the n-bit data type.
     Very few files will divide up evenly into the shifting matrix series. Therefore,
     there will usually be an incomplete matrix at the end. These rules won't
     properly encrypt/decrypt a partial matrix. Therefore, this function resets the
     matrix scale to an optimal axis based upon the number of remaining bits.
     However, if the length of the remaining n-bit word is prime, the last bit is held
     and removed from the matrix, and then the optimal axis is calculated. Once
     the new matrix is encrypted, if there is a remaining bit, it gets written out.
                                                                          */ void GetOptimalScale(void)
     {
              unsigned ResultNumber;
              unsigned HighLimit;
              unsigned x;
```

48

```
            HighLimit = Matrix.size;

Matrix.x = Matrix.y = 0;

for (x = 2; x < HighLimit; x++) { if (Matrix.size % x)
                            continue;

ResultNumber = HighLimit = Matrix.size / x;

Matrix.x = x;
                    Matrix.y = ResultNumber;
            }

Matrix.size = Matrix.x * Matrix.y;
    }
    /* End of program code */
```

Figure 4:
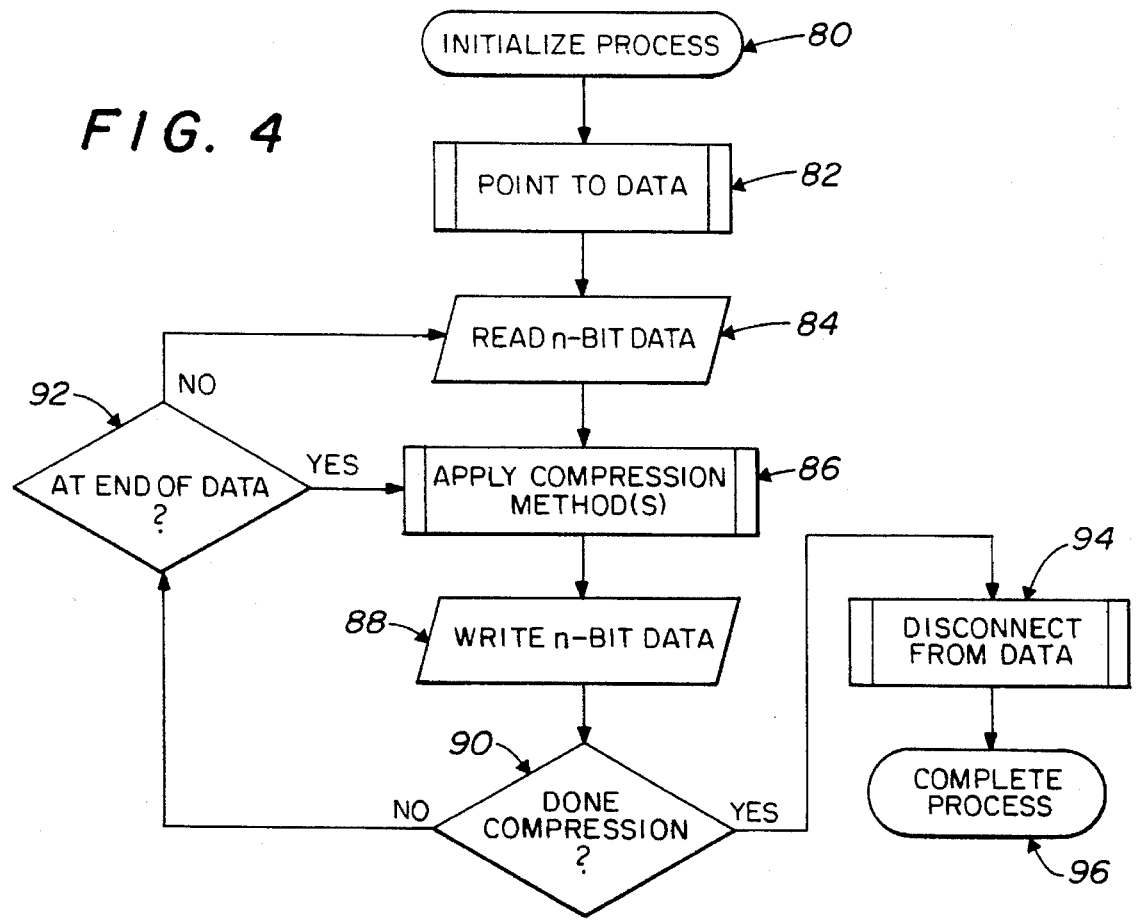
FIG. 4 is a process flow chart illustrating an implementation of the invention as a loss-less data compression method.

FIG. 4 illustrates, by example, the elemental steps of data compression. Compression is begun by the initiation process step 80 which includes such items as the declaration and initialization of variables, the allocation of memory, and parsing user input. The next step 82 involves pointing to the input data, output data, and other support data needed by the compression method(s) at step 86.

From there, the process begins by reading in an implementation of a defined amount of data. It is specific to this invention that the data is read as one or more n-bit data types at step 84 consistent and parallel with any given implementation. The data is then processed by the compression method(s) at step 86. The resulting data, now in compressed form, is written to output data at step 88.

It is then determined at step 90 whether or not compression has been completed. If not, it is determined if the end of the input data has been FIG. 4 illustrates, by example, the elemental steps of data compression. Compression is begun by the initiation process step 80 which includes such items as the declaration and initialization of variables, the allocation of memory, and parsing user input. The next step 82 involves pointing to the input data, output data, and other support data needed by the; compression method(s) at step 86.

From there, the process begins by reading in an implementation of a defined amount of data. It is specific to this invention that the data is read as one or more n-bit data types at step 84 consistent and parallel with any given implementation. The data is then processed by the compression method(s) at step 86. The resulting data, now in compressed form, is written to output data at step 88.

It is then determined at step 90 whether or not compression has been completed. If not, it is determined if the end of the input data has been reached at step 92. If not, the process forks backs to the read process at step 84, otherwise it forks to the application of the compression method(s) at step 86.

If it has been determined by the implementation that compression has been completed at step 90, then the necessary data is released at step 94, and the process is completed at step 96.

For example, and not by way of limitation, the following description illustrates one method of implementing an n-bit virtual software machine capable of performing reiterative loss-less data compression.

Most methods of loss-less data compression are based on a method in which repetitive patterns or symbols within a data file are first identified and then replaced with symbols which occupy, on average, less space in memory than the original symbols. Examples of loss-less data compression techniques include Huffman Coding, Arithmetic Coding, Dictionary-Based Compression and Lempel-Ziv Coding. Each of these methods relies on the substitution of a smaller binary string for a larger binary string based on one or more repetitive patterns of symbols or symbol patterns, or the frequency of bytes or patterns within the uncompressed data. The desired result of this process is a file which is smaller than the original.

In order for compression to occur, an uneven frequency distribution of symbols or symbol patterns must be present in the uncompressed file. The greater the unevenness of the frequencies of the symbols or symbol patterns in the original data, the greater the compression.

Currently, all known methods of loss-less data compression result in an even distribution of symbols in the compressed file. Because loss-less data compression methods rely upon the uneven distribution of symbols or symbol patterns, the even frequency distribution makes further compression undesirable or impossible.

With this invention, the concept of Reiterative n-Bit Compression (RNC) uses variable length n-bit data types to explicitly or implicitly redistribute the frequency with which symbols occur within the data. After one iteration, the frequency distribution of the symbol set representing the data may be modified explicitly by changing the size in bits of the input and/or output data type. This explicit frequency redistribution of the symbol set allows the data to be compressed reiteratively.

The following table illustrates the differences in the resulting distribution of some 8-bit characters following compression with different sized n-bit data types.

| Characters | Space | A | E | I | O | U |
|---|---|---|---|---|---|---|
| Data Type Size in Bits | Original Distribution Count of Each of the Above Characters | | | | | |
| | 4376 | 498 | 749 | 836 | 352 | 283 |
| | Distribution Count Following Compression | | | | | |
| 4 | 143 | 114 | 114 | 112 | 46 | 33 |
| 6 | 217 | 122 | 117 | 138 | 59 | 48 |
| 8 | 139 | 42 | 59 | 42 | 25 | 29 |
| 10 | 260 | 107 | 120 | 129 | 40 | 42 |
| 12 | 161 | 64 | 64 | 61 | 13 | 6 |

The first row of the above table lists the characters being evaluated for their frequency within the original file. The third row shows each character's distribution in the original input file prior to its compression. Rows 5 through list each character's distribution following compression of the original file using input data types of varying bit lengths. The first column lists the length, in bits, of the input n-bit data type.

Referring to the table, the "space" character appears 4376 times in the original file. After compressing the file using a 4-bit data type, the "space" appears 143 times. In contrast, after the file is compressed using a 10-bit data type, the "space" appears 260 times. When the file is compressed using a 6-bit data type, the character 'U' appears 48 times, compared with only 6 times following compression using a 12-bit data type.

By forcing the redistribution of bits, the compression ratio can be forced to vary, thereby permitting optimization of the next compression pass. The following table shows an example of compression results of data. The first column lists the size, in bytes, of the file before a given compression pass. The second column lists the size of the n-bit data type. The third column lists the number of the actual compression pass. The fourth column lists the size of the file, in bytes, following the compression pass.

Some compression passes have been attempted more than once with varying sized input data types. This allows for selection of the best compression ratio for a given n-bit data type. Compression attempts that do not result in compression are italicized. The compression pass that achieved the most compression is boldfaced.

| Size | Nbits | Pass | Comp. Size |
|---|---|---|---|
| 18119 | 10 | 1 | 14174 |
| 14174 | 10 | 2 | 14157 |
| 14157 | 10 | 3 | 14156 |
|  | 9 | 3 | 14136 |
|  | 8 | 3 | 13900 |
|  | 7 | 3 | 14091 |
|  | 6 | 3 | 14059 |
|  | 5 | 3 | 14558 |
| 13900 | 8 | 4 | 13832 |
|  | 7 | 4 | 13900 |
|  | 6 | 4 | 13907 |
|  | 9 | 4 | 13897 |
|  | 10 | 4 | 13894 |
|  | 11 | 4 | 13911 |

It should also be noted that frequency redistribution can be achieved by implementing such data conversion algorithms as alternating block-based inversion, bit-shifting, or exclusive OR operations tailored for the target, or a multiple of the target data type.

As another example, and not by way of limitation, the following description illustrates one method of implementing a virtual machine or computer capable of performing rule-based n-bit arbitrary precision arithmetic:

Rule-based n-Bit Arithmetic (RNA) performs binary arithmetic operations on fixed or floating point data of arbitrary precision where such precision is limited only by the real or virtual address space of the computer. Arithmetic operations include, but are not limited to, binary addition, subtraction, multiplication, and division.

As part of its method, RNA contains two new data types whose notations are unique and are not described in any previously existing data types or data notations. One of these notations represents integer values. The other notation represents floating point values.

The majority of computers and computer languages now conforms to the following internal representation of integer values:

1. The left-most bit, the sign bit ("S"), is used to contain the sign of the number, with the usual interpretation that 0 means positive or plus and 1 means negative or minus.
2. The "decimal" or radix point is assumed to be affixed at the left or right end of the number.
3. The remaining bits represent the binary values ("B") of the number.

A standard signed 16-bit value would be stored as follows:

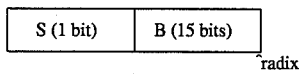
radix

With regard to floating point numbers, the following specific notation endorsed by the IEEE (Institute of Electrical and Electronic Engineers) is the standard:

1. The left-most bit is the sign bit ("S").
2. The next eight bits are the exponent ("E"). The exponent is interpreted as an integer in excess-127 code. Excess-127 code allows the exponent to represent numbers from -127 through 128.
3. The remaining bits are the mantissa ("M"). The value of the mantissa is normally defined as 1 plus the value of "M" treated as a binary fraction with the radix at the left end.

A standard signed, single precision floating point value would be stored as follows:

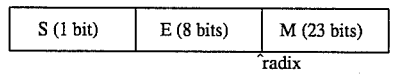
radix

This data type has an upper limit of 64 bits (double precision) and 128 bits (quadruple precision).

The following data types represent RNA integer and floating point values.

RNA integer values are represented as follows:

The left-most bit, the sign bit ("S"), is used to contain the sign of the number with the interpretation that 0 means positive and 1 means negative.

The first n-Bit value to the right of the sign bit identifies the length in bits ("L") of the binary representation of the number. The size and limit of this value is implementation specific.

The second n-Bit value to the right of the sign bit represents the binary values ("B") of the number beginning with the least significant digit (LSD) and extending to the most significant digit (MSD).

A signed n-Bit integer value would be stored as follows:

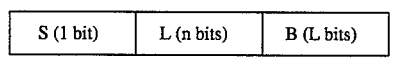

For example, any binary integer value from 1 to 16,777,216 significant digits in length could be stored with the following n-Bit data type:

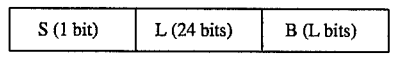

RNA floating point values are represented as follows:

1. The left-most bit, the sign bit ("S"), is used to contain the sign of the number with the interpretation that 0 means positive and 1 means negative.
2. The first n-Bit value to the right of the sign bit identifies the length in bits ("L") of the binary representation of the number. The size and limit of this value is implementation specific.
3. The second n-Bit value to the right of the sign bit identifies the radix point of the number ("B"). The size in bits of this field is identical to the size of the previous n-Bit field, (L).
4. The third n-Bit value to the right of the sign bit represents the binary values ("B") of the number beginning with the least significant bit (LSB) and extending to the most significant bit (MSB).

A signed n-Bit floating-point number would be stored as follows:

| S (1 bit) | L (n bits) | R (n bits) | B (L bits) |

For example, any binary floating-point value from 1 to 16,777,216 significant digits in length could be stored with the following n-Bit data type:

| S (1 bit) | L (24 bits) | R (24 bits) | B (L bits) |

Binary addition, subtraction, multiplication, and division are accomplished with n-Bit data types using standard methods. Addition may be performed using binary adders. Subtraction may be performed by using "true complement" notation and adding the minuend to the complemented subtrahend. Multiplication is the result of repeated binary addition. Division is the result of repeated binary subtraction.

To add the following two n-Bit floating-point numbers:

11.001 + 1.011011
11.001 =

| S = 0 | L = 0101 | R = 0010 | B = 11001 |

1.011011 =

| S = 0 | L = 0111 | R = 0001 | B = 1011011 |

```
        11.001
    +   1.011011
(LSB) 100.100011  (MSB) =
```

| S = 0 | L = 1001 | R = 0011 | B = 100100011 |

Negative numbers may be stored in complemented form to facilitate the ease of subtraction. By using "true complement" notation (i.e., reversing the value of each binary digit in the representation of the number), a binary adder may be used to accomplish binary addition, subtraction, multiplication, and division. This means that RNA may be implemented in microcode or at the level of hardware circuitry. At this level, RNA may be implemented as a microprocessor function or as a specific purpose hardware component of a general purpose computer.

Figure 5:
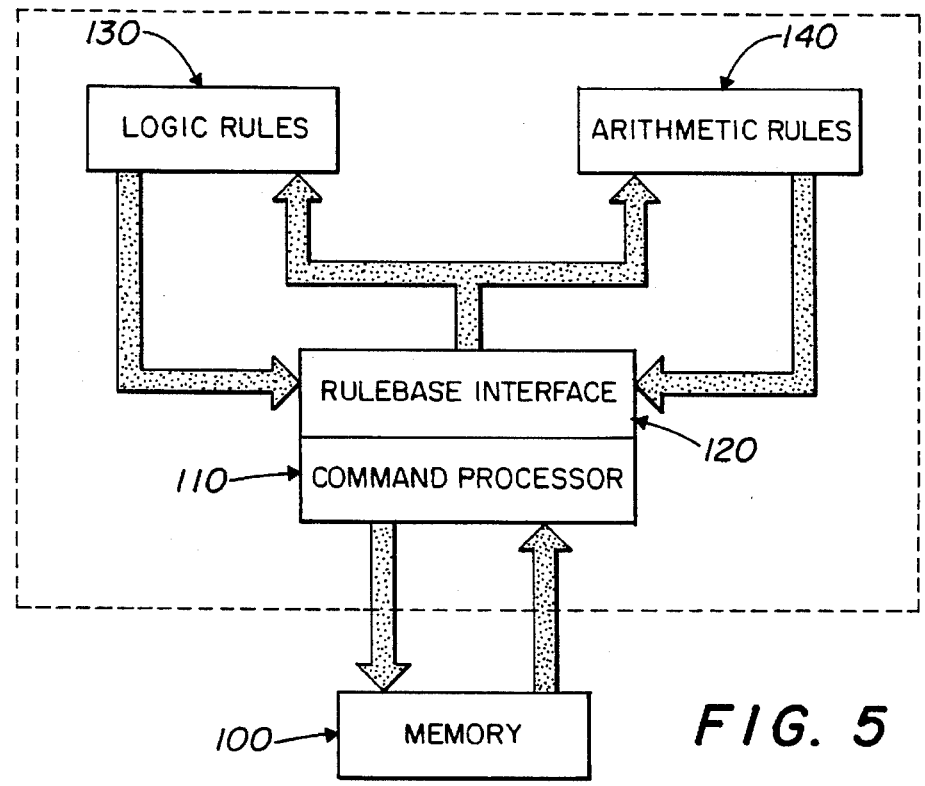
FIG. 5 is a diagram illustrating an implementation of the invention as an arbitrary precision arithmetic method.

FIG. 5 describes an example of an Arithmetic Logic Unit (ALU) which implements Rule-based n-Bit Arithmetic (RNA). One or more n-Bit values are retrieved from memory 100 by the command processor 110. The command processor 110 interprets the values as data or instructions, depending on their locations in memory 100, and submits them to the rule-base interface 120.

If the instruction is a logic instruction, the data and the instruction are submitted to the logic rule-base 130. Logic rules include, but are not limited to, AND, OR, NOT, NAND, and NOR logic functions. Once the appropriate rule has been applied to the data, the result is returned to the rule-base interface 120. Additional logic and/or arithmetic rules may be applied to the data before it is returned to memory 100.

If the instruction is an arithmetic instruction, the data and instruction are submitted by the rule-base interface 120 to the arithmetic rule-base 140. Arithmetic rules include, but are not limited to ADDITION, SUBTRACTION, MULTIPLICATION, and DIVISION. Once the arithmetic rule 140 has been applied to the data, the result is returned to the rule-base interface 120. Additional arithmetic and/or logic rules may be applied to the data before it is returned to memory 100.

The advantages of RNA are:
1. It provides greater precision than any other arbitrary precision arithmetic method.
2. The size of the numbers used in RNA is limited only by the real or virtual address space of the computer.
3. RNA may be implemented in hardware of software.
4. RNA is processor independent.
5. RNA provides faster calculations of very large arbitrary precision numbers.

A specific purpose RULE-BASED n-BIT VIRTUAL SOFTWARE MACHINE, as uniquely described by this invention, is any specific purpose virtual software machine which uses a rule-base as an instruction set to perform binary string operations on n-bit data types.

The COMMAND PROCESSOR is a machine that uses a program which receives n-bit data types and command language instructions as input and performs operations upon the input using one or more rules. Each rule is a type of processor instruction which performs a binary string operation upon one or more n-bit data types. After the input data has been processed, the command processor outputs data in the form of one or more n-bit data types.

An n-bit data type is defined as a data type consisting of n bits (or binary digits) where n is any number greater than zero. There is no inherent upper limit on n-bit data types. Variable length n-bit data types are used as standard input and output and are maintained and managed by the invention.

The RULE-BASE INTERFACE is defined as a method of transferring data between the command processor and the rule-base. The data in the form of one or more n-bit data types is passed to the rule-base interface by the command processor. The rule-base interface, in turn, identifies the rule or rules that are to be used in processing the data. The data is dispatched as one or more arguments to the selected rule within the rule-base and the rule is applied. After the data has been modified in accordance with the specified rule or rules, the modified data is returned to the rule-base interface. The rule-base interface may iteratively submit the data to one or more rules. Once the conditions for the modification of the data by the rule-base have been satisfied, the data is returned as one or more n-bit data types to the command processor. The command processor then outputs the data.

The RULE-BASE INTERFACE manages access to the rules within the rule-base using any access method including, but not limited to, linked lists, tree structures, relational database tables, and hyper-link stacks.

The RULE-BASE is a collection or set of rules. Each rule applies a binary string operation to the input data. A BINARY STRING OPERATION is any operation which performs bit level operations on one or more binary strings representing n-bit data types. A binary string operation may emulate processor instructions such as binary ANDs, ORs, XORs, and COMPLEMENT operations. Combinations of these operations may emulate processor instruction sets with the additional advantage of providing virtual n-bit data and instruction registers within the virtual machine in which to perform these operations. Binary string operations may also emulate more complex operations such as addition, subtraction, multiplication, division, vector, and matrix operations. These operations are implemented in such a way that there is no inherent upper limit on the length of the n-bit data types used as input or output.

The types of data structures which may be used to implement the rule-base as it is defined in the invention include, but are not limited to, the following: relational database tables, C or C++ language header files, any generation computer language function(s) or subroutine(s), object class libraries, and EPROM assembly language subroutines, and microcode instruction sets.

Although the invention and several of its preferred embodiments have been described and illustrated in detail, the same is by way of example only and should not be taken by way of limitation. The spirit and scope of the present invention are limited only to the terms of the appended claims.

We claim:

1. A method for encrypting information data from a data source comprising the steps of:

coupling at least one n-bit data string of input data as variable length n-bit data types containing bits representing said information data and including control bits to a command processor;

storing a plurality of encryption rules in a rule-base memory for processing the n-bit data string;

coupling a rule-base interface between said command processor and said rule-base memory for identifying specific encryption rules stored in said rule-base memory according to said control bits in said n-bit input data string received from said command processor;

modifying the n-bit data string in the rule-base in accordance with the identified encryption rules to encrypt said information data bits; and transferring said encrypted data to said command processor for output as variable length n-bit data types.

2. A method as in claim 1 further including the steps of:

identifying said data source with said control bits in said n-bit data string; and including bits in said control bits that represent at least one argument to be used when accessing said rule-base.

3. A method as in claim 1 further comprising the steps of:

storing said rules in a memory in said rule-base; and defining said rules as binary string operations.

4. A method as in claim 2 further comprising the steps of:

coupling one or more of said arguments to said identified rule within said rule-base; and applying the identified rule to the n-bit information data to modify said information data and to perform said encryption.

5. A method as in claim 4 further including the steps of:

appending additional arguments, as needed, to said modified information according to said identified rule in said rule-base; and returning the modified information data to said rule-base interface along with said needed arguments.

6. A method as in claim 5 further including the steps of:

iteratively submitting said modified data to at least another one of said rules stored in said rule-base in accordance with said arguments appended by said identified rule for further modification until said data modification satisfies all of said arguments; and returning said satisfied modification data to said command processor as one or more n-bit data strings that are not required to correspond to the n-bit size and number of n-bit input data strings coupled to said command processor from said data source.

7. A method as in claim 5 further including the step of encrypting said information data to prevent the determination of the original position of any bit in the bit stream of the input information data based upon the position of any bit in the encrypted bit stream.

8. A method as in claim 7 further including the step of encrypting and decrypting said information data with said rule-base such that neither encryption nor decryption is dependent upon an explicit encryption key, a specific encode/decode rule, or a specified data type.

9. A method as in claim 5 further comprising the step of user-defining the implementation of said encryption/decryption since no single algorithm or rule must be defined.

10. A method as in claim 1 further including the steps of:

providing multiple encryption keys to a single encrypted message such that parts of an encrypted message are accessible only to some users and not others; and distributing the encryption/decryption of a message across multiple machines for multiple users.

11. A method as in claim 10 further including the step of defining any encryption key explicitly.

12. A method as in claim 10 further including the step of defining any encryption key implicitly.

* * * * *